US010977612B2

(12) United States Patent
Yang

(10) Patent No.: US 10,977,612 B2
(45) Date of Patent: Apr. 13, 2021

(54) ELECTRONIC INVENTORY TRACKING SYSTEM AND ASSOCIATED USER INTERFACES

(71) Applicant: Coupang, Corp., Seoul (KR)

(72) Inventor: Byung Suk Yang, Anyang (KR)

(73) Assignee: Coupang, Corp., Seoul (KR)

( * ) Notice: Subject to any disclaimer, the term of this patent is extended or adjusted under 35 U.S.C. 154(b) by 0 days.

(21) Appl. No.: 16/373,140

(22) Filed: Apr. 2, 2019

(65) Prior Publication Data

US 2020/0320465 A1   Oct. 8, 2020

(51) Int. Cl.
*G06Q 10/08* (2012.01)
*G06F 3/0484* (2013.01)

(52) U.S. Cl.
CPC ......... *G06Q 10/087* (2013.01); *G06F 3/0484* (2013.01); *G06Q 10/0833* (2013.01)

(58) Field of Classification Search
CPC . G06Q 10/087; G06Q 10/0833; G06F 3/0484
USPC .......................................................... 705/28
See application file for complete search history.

(56) References Cited

U.S. PATENT DOCUMENTS

| 10,163,071 | B1 * | 12/2018 | Quan | .................... | G06Q 10/087 |
| 10,552,788 | B1 * | 2/2020 | Hahn | ..................... | G08B 25/14 |
| 2005/0038718 | A1 * | 2/2005 | Barnes | ............... | G06Q 30/0238 |
| | | | | | 705/28 |

(Continued)

FOREIGN PATENT DOCUMENTS

JP   H 11203372 A    7/1999
KR   10-2010-0028374   3/2010

(Continued)

OTHER PUBLICATIONS

Written Opinion and International Search Report in PCT Application No. PCT/IB2020/053044, dated Jul. 9, 2020 (8 pages).

(Continued)

*Primary Examiner* — Russell S Glass
(74) *Attorney, Agent, or Firm* — Finnegan, Henderson, Farabow, Garrett & Dunner, LLP

(57) ABSTRACT

A computer-implemented system for tracking items in a supply chain. The system may comprise a memory storing instructions and at least one processor configured to execute instructions. Those stored instructions include receiving a first input that an item has entered a first station, the input comprising a first location identifier; assigning an inventory identifier to the item; storing the location identifier and the inventory identifier in a data store, associating the location identifier with the inventory identifier; receiving a second input comprising the inventory identifier and a second location identifier when the item is moved to a new station; storing the new location identifier when the item is moved to a new station; storing the new location identifier such that the new location identifier is associated with the inventory identifier with at least one previous station associated with the inventory identifier; receiving a request for a diagram; generating a diagram tracking the item using at least the inventory identifier and at least one location identifier, wherein the diagram tracks the item from the inbound station to the most recent station; and transmitting the diagram for display.

20 Claims, 11 Drawing Sheets

(56) References Cited

U.S. PATENT DOCUMENTS

| | | | | |
|---|---|---|---|---|
| 2011/0054979 A1* | 3/2011 | Cova | ................... | G06Q 10/06 |
| | | | | 705/7.37 |
| 2013/0233922 A1* | 9/2013 | Schoening | ......... | G06Q 10/0875 |
| | | | | 235/385 |
| 2015/0317644 A1 | 11/2015 | Chanez et al. | | |
| 2018/0053145 A1 | 2/2018 | Jones et al. | | |

FOREIGN PATENT DOCUMENTS

| | | |
|---|---|---|
| KR | 10-2013-0017903 | 2/2013 |
| TW | 200500909 A | 1/2005 |
| TW | 201440017 A | 10/2014 |
| WO | WO 2004/090778 A1 | 10/2004 |

OTHER PUBLICATIONS

Taiwanese Office Action dated Oct. 8, 2020 in Taiwanese Patent Application No. 109111514, and translation (14 pages).
Australian First Examination Report in Application No. 2020255375 dated Nov. 17, 2020 (6 pages).

* cited by examiner

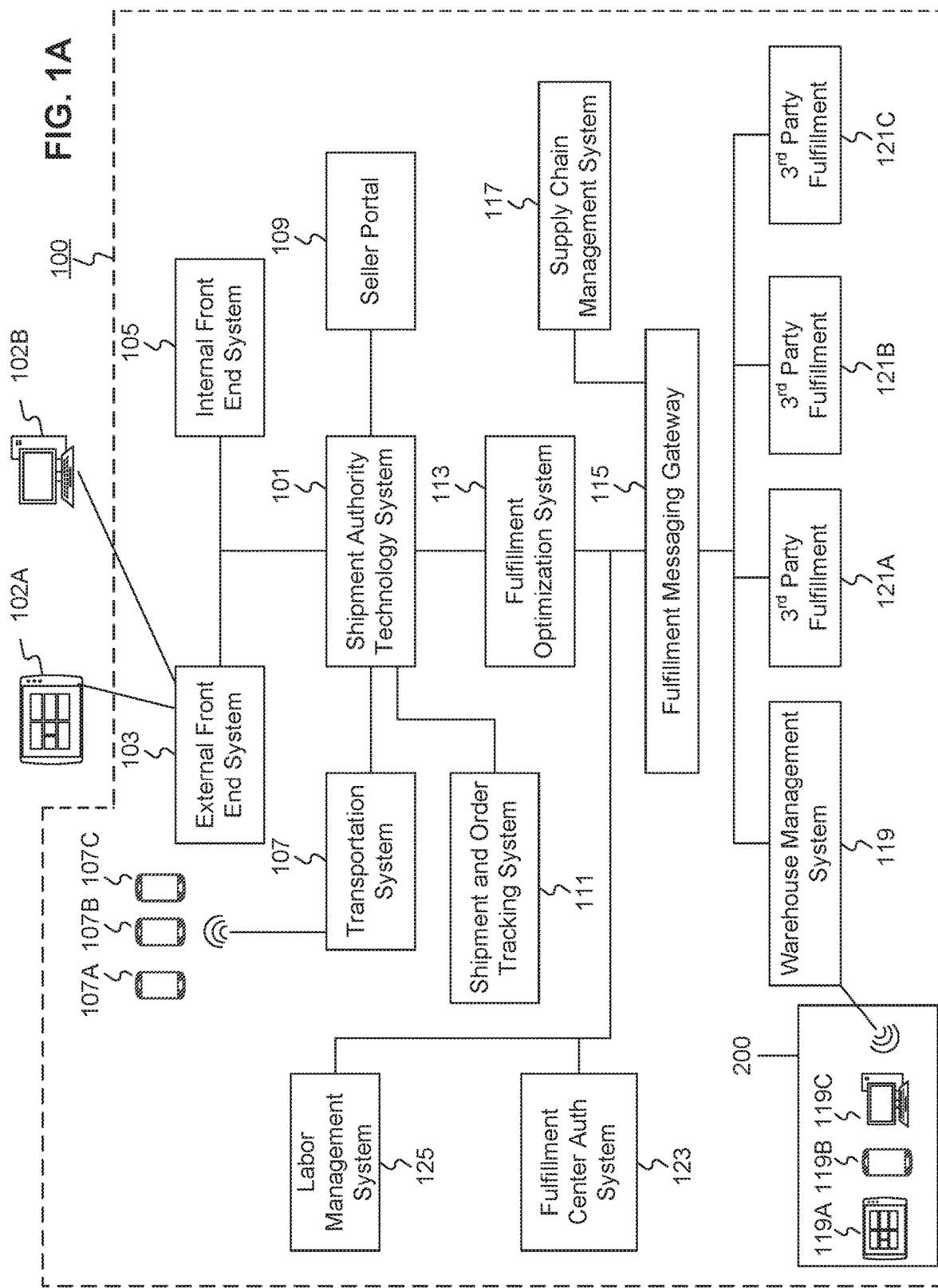

ELECTRONIC INVENTORY TRACKING SYSTEM AND ASSOCIATED USER INTERFACES

TECHNICAL FIELD

The present disclosure generally relates to computerized systems and methods for tracking inventory. In particular, embodiments of the present disclosure relate to inventive and unconventional systems related to how a system tracks inventory through a supply chain, such as a warehouse, and provides the information to a user in a user-friendly interface.

BACKGROUND

Inventory tracking is an important part of any supply chain. However, systems typically only provide a high level description of what is stored in a particular location within the supply chain. For example, a warehouse inventory list may only show the total number of stuffed animals stored at the various locations.

These systems do not typically track a specific item or product through the supply chain, but indicate the summary of the parts that are within a location. Focusing on storage location, however, does not provide an efficient method for tracking inventory. This focus can only show where there is space to store more items or direct a person on where to look for a type of item. This focus cannot track the efficiency of how products move through the supply chain or provide any accountability when an item is lost.

Therefore, there is a need for improved methods and systems for tracking inventory through the supply chain. Doing so improves upon data accuracy and fidelity, enables improved electronic tracking of inventory items, and enhances the ability of computer software to locate items in a supply chain infrastructure and/or warehouse. Additionally, providing an easily understood graphic for a user to review the path the item went through the supply chain provides the user with an efficient way to act upon the analysis provide on the data.

SUMMARY

One aspect of the present disclosure is directed to a computer-implemented system for tracking items in a supply chain. The system may comprise a memory storing instructions and at least one processor configured to execute instructions. Those stored instructions include receiving a first input that an item has entered a first station, the input comprising a first location identifier; assigning an inventory identifier to the item; storing the location identifier and the inventory identifier in a data store, associating the location identifier with the inventory identifier; receiving a second input comprising the inventory identifier and a second location identifier when the item is moved to a new station; storing the new location identifier when the item is moved to a new station; storing the new location identifier such that the new location identifier is associated with the inventory identifier with at least one previous station associated with the inventory identifier; receiving a request form a user for a diagram; generating a diagram tracking the item using at least the inventory identifier and at least one location identifier, wherein the diagram tracks the item from the inbound station to the most recent station; and displaying the diagram.

In another embodiment the instructions further include causing the processor to store the diagram in the data store.

In another embodiment, the data store comprises at least one database. In another embodiment, the first input includes a user identifier. In another embodiment, the second input also includes a user identifier that identifies what user placed the item in the station.

In another embodiment, the item contains subitems that receive a subitem inventory identifier when the subitems are stored in different location identifiers. In another embodiment, the inventory identifier accounts for subitems by creating a subitem inventory identifier that appends additional information to the end of the inventory identifier. In another embodiment, the diagram is a tree diagram. In another embodiment, the inventory identifier accounts for subitems by creating a subitem inventory identifier that appends additional information to the end of the inventory identifier; and wherein the diagram is a tree diagram with each branch of the tree diagram representing a different subitem.

In another embodiment, the computer-implemented system may further include the first input where in the first input includes scan data recorded when scanning a package identifier of the item, the scan data comprises at least one of the inventory identifier, a package identifier, a user identifier, an employee identifier, a device identifier, an International Mobile Subscription Identifier, a phone number, a Universal Unique Identifier, a Globally Unique Identifier, a date, a time, and a location identifier.

Another aspect of the present disclosure is directed to a method for tracking items in a supply chain, comprising the steps of receiving a first input that an item has entered an inbound station, the input comprising a first location identifier; assigning an inventory identifier to the item; storing the location identifier and the inventory identifier, associating the location identifier with the inventory identifier; receiving a second input comprising the inventory identifier and a second location identifier when the item is moved to a new station; storing the new location identifier such that the new location identifier is associated with the inventory identifier with at least one previous station associated with the inventory identifier; receiving a request from a user for a diagram; generating a diagram tracking the item using at least the inventory identifier and at least one location identifier, wherein the diagram tracks the item from the inbound station to the most recent station; and displaying the diagram.

In another embodiment, the method further comprises storing the diagram. In another embodiment, the first input includes scan data from a user scanning the item, the scan data comprises at least one of the inventory identifier, a package identifier, a user identifier, an employee identifier, a device identifier, an International Mobile Subscription Identifier, a phone number, a Universal Unique Identifier, a Globally Unique Identifier, a date, a time, and a location identifier.

In another embodiment, the location identifier and inventory identifier are stored in at least one database. In another embodiment, the first input also includes a user identifier that identifies what user placed the item in the station. In another embodiment, the second input also includes a user identifier that identifies what user placed the item in the station.

In another embodiment, the item contains subitems that receive a subitem inventory identifier when the subitems are stored in different location identifiers. In another embodiment, the inventory identifier accounts for subitems by creating a subitem inventory identifier that appends additional information to the end of the inventory identifier. In another embodiment, the diagram is a tree diagram. In another embodiment, the inventory identifier accounts for subitems by creating a subitem inventory identifier that appends additional information to the end of the inventory identifier; and the diagram is a tree diagram with each branch of the tree diagram representing a different subitem.

Yet another aspect of the present disclosure is directed to a computer-implemented system for tracking items in a supply chain, comprising a memory storing instructions and at least one processor configured to execute the instructions. The instructions including receiving a first input that an item has entered an inbound station, the input comprising a first location identifier, wherein the first input includes scan data from a user scanning the item, the scan data comprises at least one of the inventory identifier, a package identifier, a user identifier, an employee identifier, a device identifier, an International Mobile Subscription Identifier, a phone number, a Universal Unique Identifier, a Globally Unique Identifier, a date, a time, and a location identifier. The instructions also include assigning an inventory identifier to the item, wherein the inventory identifier accounts for subitems by creating a subitem inventory identifier that appends additional information to the end of the inventory identifier, storing the location identifier and the inventory identifier, associating the location identifier with the inventory identifier; receiving a second input comprising the inventory identifier and a second location identifier when the item is moved to a new station, wherein the second input includes scan data from a user scanning the item, the scan data comprises at least one of the inventory identifier, a package identifier, a user identifier, an employee identifier, a device identifier, an International Mobile Subscription Identifier, a phone number, a Universal Unique Identifier, a Globally Unique Identifier, a date, a time, and a location identifier. The instructions also include storing the new location identifier such that the new location identifier is associated with the inventory identifier with at least one previous station associate with the inventory identifier; receiving a request from a user for a diagram; generating a diagram tracking the item using at least the inventory identifier and at least one location identifier, wherein the diagram tracks the item from the inbound station to the most recent station, and wherein the diagram is a tree diagram with each branch of the tree diagram representing a different subitem when the item is divided into subitems; and displaying the diagram.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for tracking inventory in a supply chain, such as within a warehouse.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3rd party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
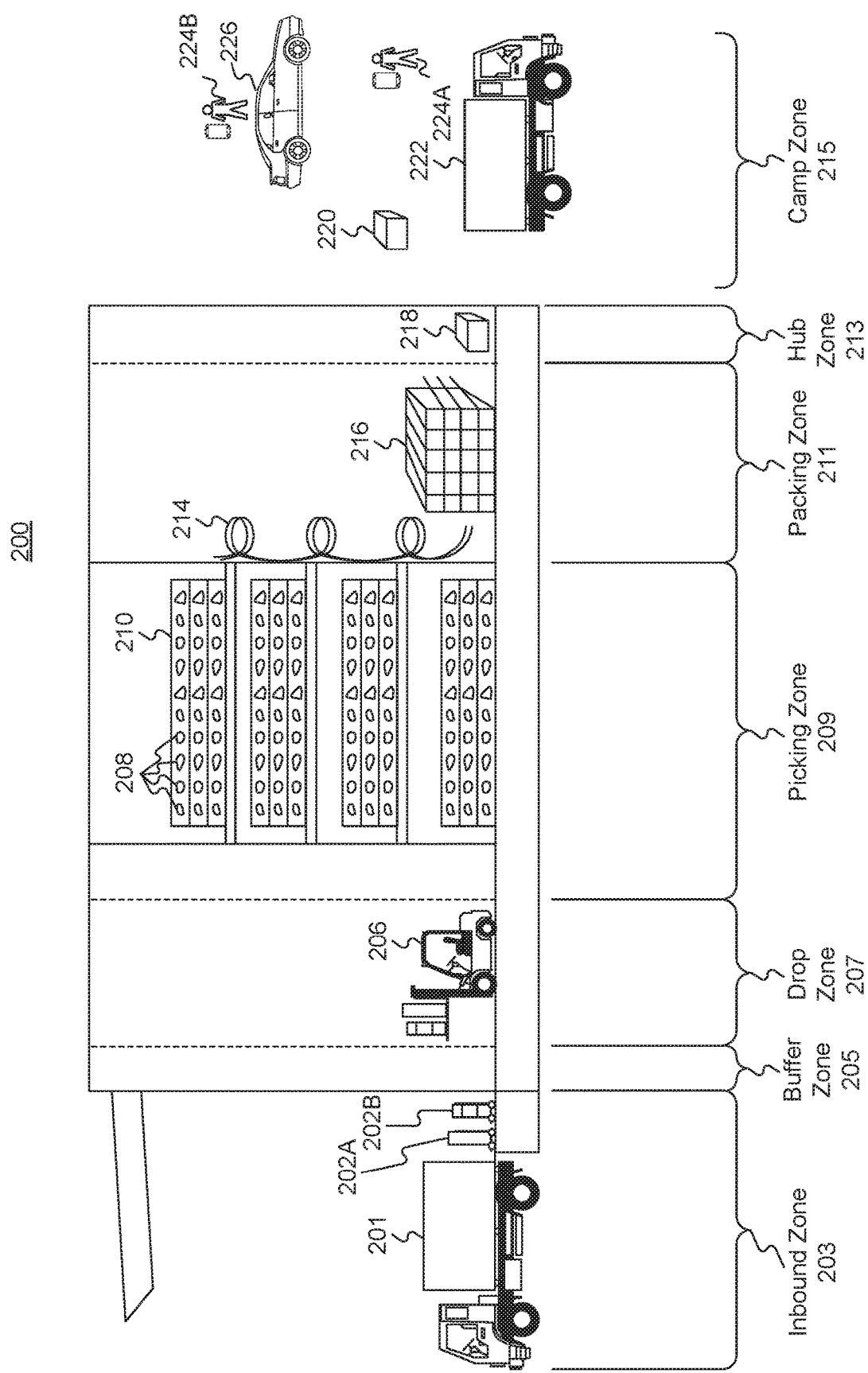
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119G to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 2246.

Figure 3A:
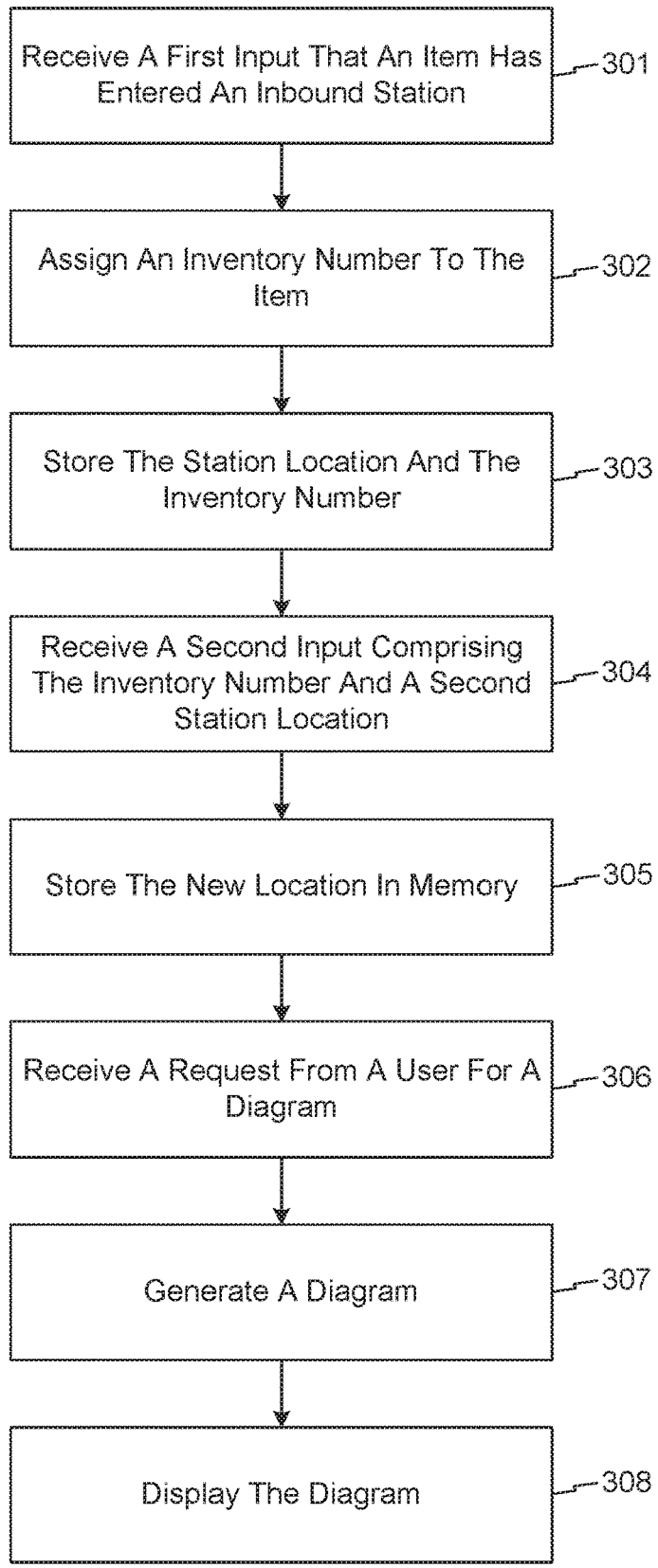
FIG. 3A is a flowchart illustrating steps of an exemplary item tracking process that may be performed by a processor, consistent with the disclosed embodiments.
Figure 6:
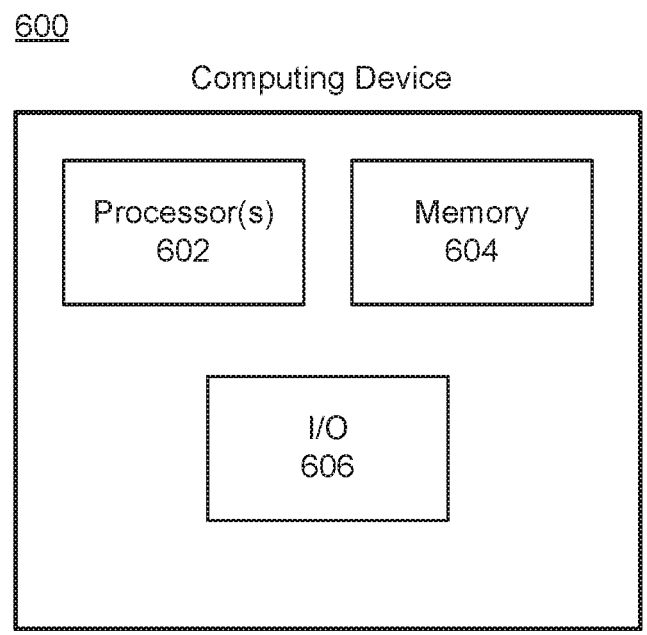
FIG. 6 is a block diagram of an exemplary computing device, consistent with the disclosed embodiments.

FIG. 3A is a flowchart illustrating steps of an exemplary item tracking process 300 that may be performed by a processor in accordance with the disclosed embodiments. For example, process 300 may be performed entirely or in part on the computer system in WMS 119. Alternatively, some steps may occur in WMS 119 and other steps may be performed on a computing device such as a computer or smart phone or PDA (e.g., devices 119A-119C in FIG. 1A). (Computing device 600, described below with respect to FIG. 6, is an example of such a device that may perform the process using processor 602.) While process 300 is described with respect to computing device 600, one of skill will understand that other devices may implement process 300. One of skill will further understand that the steps illustrated in FIG. 3A are exemplary and steps may be added, duplicated, modified, or deleted in some embodiments.

At step 301, processor 602 receives a first input that an item has entered a first station. This may occur, for example, when an operator places the item into the inbound station and enters identification information for the item. The operator may enter the information on a portable computing device or at a computing device station. In some embodiments, the entry may be made by typing an identifier into a computing device (e.g., mobile device 119B) or by scanning a barcode or other identifier. When the item is scanned, processor 602 receives scan data that may include any of inventory identifier, a package identifier, a quantity of sub-items, a user identifier, an employee identifier, a device identifier, an International Mobile Subscription Identifier, a phone number, a Universal Unique Identifier, a Globally Unique Identifier, a date, a time, and a location identifier. Further, the scan data may be any input from an operator or an optical reading. An inventory identifier may be an identifier used to identify an individual item of a certain Stock Keeping Unit (SKU), the SKU being a type of item for sale distinguished by attributes such as manufacturer, type of product, description, material, size, and color.

For example, in some embodiments the entry may also include a user identifier registering the operator that submitted the entry. The user identifier may be a user identifier stored in a database and associated with the user or the device. This may be automatically generated by the computing device because the operator is logged in to the device or because the operator registered with WMS 119 to work a specific zone when the entry was made. The scan data may be received by WMS 119 as one packet of data, as discrete packets of data for every scan taken by the operator, or any combination thereof.

A station may represent any area where the item is stored. For example, FIG. 2 provides a number of "zones," including inbound zone 203, buffer zone 205, drop zone 207, and others. Each of these zones could be a station or include a plurality of stations therein.

In some embodiments, the first input includes a first location identifier. The first input may also include other information, such as a user identity, time information, and other data useful for tracking an item through the supply chain. For example, a user identifier can allow a user to determine what operator last moved the item. This may be useful, for example, when an item is missing and a user wants to determine what happened to the item.

At step 302, processor 602 assigns an inventory identifier to the item. This number may be the barcode or other identifier used to enter the item in step 301 or another number assigned by the processor 602. The identifier may be numeric, alphanumeric, or any other form of identifier known in the art.

At step 303, processor 602 stores the location identifier and inventory identifier in memory. In some embodiments, this memory is within WMS 119. The memory may store the data as part of a database or in other memory structures known in the art. Storing the location identifier may, in some embodiments, comprise storing the location identifier in association with an inventory identifier.

Figure 3B:
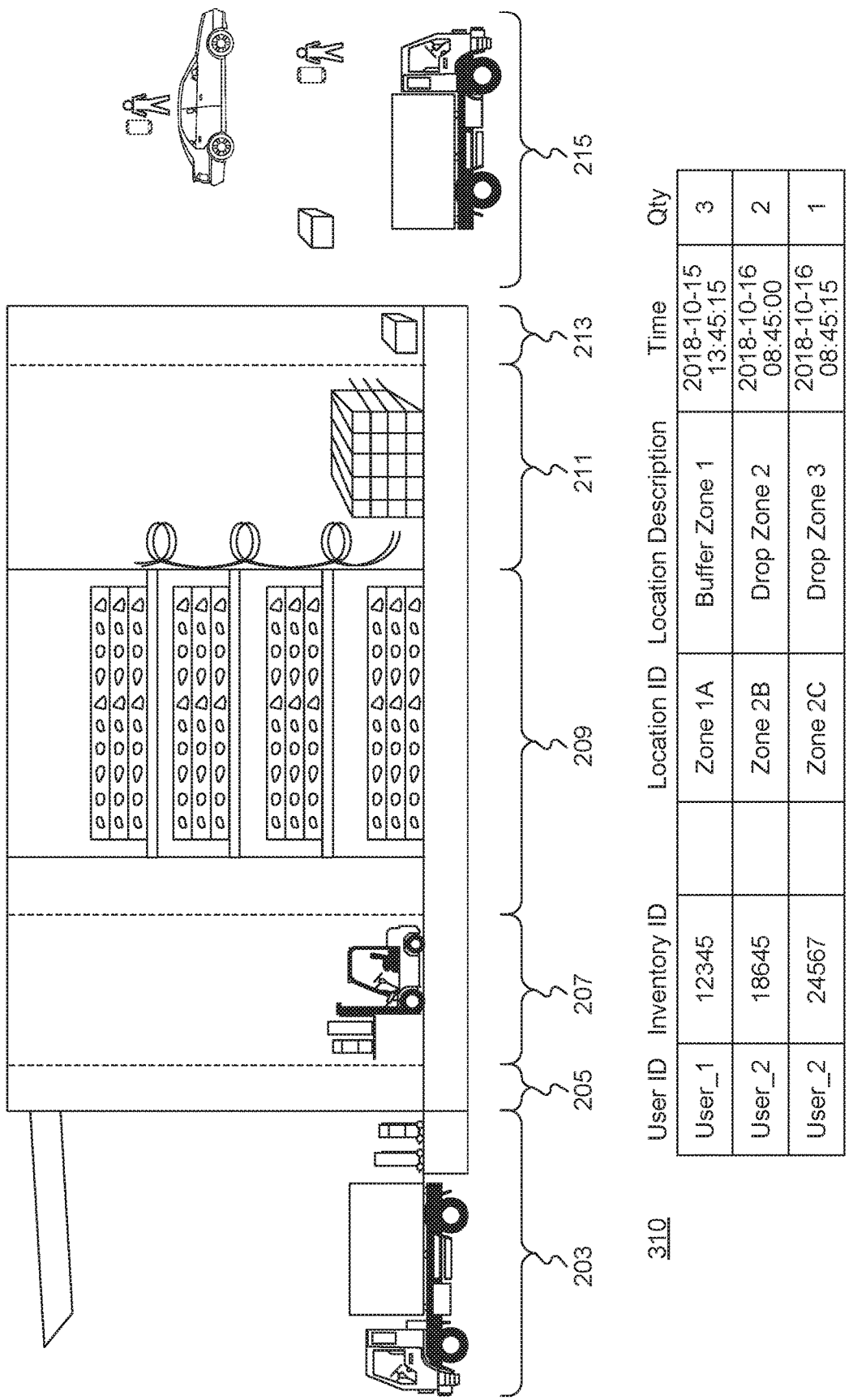
FIG. 3B is an exemplary database table showing an embodiment of how scan data may be stored.

For example, FIG. 3B shows an exemplary database storing the scan data. In this embodiment, the database table 310 includes a column for the User ID, the Inventory ID, Location ID, Location Description, Time, and Quantity. A user (e.g., a picker) may generate scan data by scanning a package identifier using a mobile device they have logged into. Alternatively, the mobile device itself may have an identifier associated with it. Processor 602 may store the mobile device identifier or the user identifier in the User ID column. Processor 602 may also store an Inventory ID (e.g., an inventory identifier) that indicates what item was scanned. Processor 602 may also store a Location ID, indicating a station or location where the item was stored and/or scanned. In exemplary FIG. 3B, those locations are zones 1A, 2B, and 2C. The Location Description column may then provide an alternate identifier or description that is associated with the Location ID. In this example, Zone 1A is associated with Buffer Zone 1 (e.g., a first zone within buffer zone 205), Zone 2B is associated with Drop Zone 2 (e.g., a second zone within drop zone 207), and Zone 2C is associated with Drop Zone 3 (e.g., a third zone within drop zone 207). The database table 310 may also include a Time column that indicates the date and time when the scan data was generated, indicating when the item was stored and/or scanned in the location. Finally, the database table 310 may include a quantity column. As described below, the item may have subitems, such as a package of stuffed animals having a number of stuffed animals within the package. The quantity column indicates how many subitems are contained within the item.

At step 304, processor 602 receives a second input. This input occurs when an operator moves the item to a new station. After moving the item, the operator enters the item's identifier and the new location. In some embodiments, this may consist of scanning a barcode on the item to enter the item identifier and scanning a barcode at the station to enter the location identifier. In other embodiments, the operator may enter the inventory identifier and location identifier by typing an identifier into a computing device (e.g., mobile device 119B) or a combination of scanning and typing the entry. In some embodiments, the operator may use a computer or portable computing device (e.g., computing devices 119A-119C) to enter the information. When the item is scanned, processor 602 receives scan data that may include any of inventory identifier, a package identifier, a user identifier, an employee identifier, a device identifier, an International Mobile Subscription Identifier, a phone number, a Universal Unique Identifier, a Globally Unique Identifier, a date, a time, and a location identifier. This scan data may be received as one packet of data, as discrete packets of data for every scan taken by the operator, or any combination thereof.

In some embodiments, the second input includes a new location identifier. The second input may also include other information, such as a user identity, time information, and other data useful for tracking an item through the supply chain. For example, a user identity can allow a user to determine what operator last moved the item. This may be useful, for example, when an item is missing and a user wants to determine what happened to the item.

At step 305, processor 602 stores the new location identifier in memory 604 so that the new location identifier is associated with the inventory identifier. The new location identifier is associated with the inventory identifier without overwriting any previous entries for the inventory identifier, allowing the memory to retain a full history of the item's locations throughout the supply chain over time. This allows the processor 602 to track the progress of the item through the stations, for example being able to determine each of the stations that the item was located while within a warehouse. In some embodiments, the location identifiers will be stored such that the processor can determine the order of the stations the item was stored in.

At step 306, processor 602 receives a request from a user to track the item and provide a diagram representing the analysis. A user may make the request from any computing device that connects to system 100 (e.g., computing devices 119A-119C). The request indicates the item to track and that a diagram should be generated for the user to review the analysis. In some embodiments, the request includes the inventory identifier. In other embodiments, the request includes another identifier associated with the inventory identifier.

At step 307, processor 602 tracks the item through the supply chain and generates a diagram representing this analysis. The processor 602 uses the inventory identifier to identify the different location identifiers associated with the inventory identifier, which corresponds to the locations the item was stored in. For example, the processor 602 may generate a linked list that identifies the various entries in a database that include scan data containing the inventory identifier. The linked list can generate pointers that indicate the path the item took through the supply chains, such as each station the item was stored in. For example, the linked list may first point to the first item location, and the next pointer indicates another entry in the database that shows the item located in a second location. In this way, the linked list may continue through the various locations the item was stored in to create an intermediate data structure based on the database of scan data that allows processor 602 to track the item through the supply chain. Other embodiments may use other structures to analyze the database of scan data to determine where the item has been located, such as dynamic arrays.

Using this information, processor 602 generates a diagram. (FIGS. 4 and 5, described below, are examples of different diagrams generated by processor 602, though one of ordinary skill will understand that other arrangements and representations are possible, including those with different appearances.)

At step 308, processor 602 instructs computing device 600 to display the diagram described above. As previously discussed, the displayed diagram allows a user to track an item's path through the supply chain.

Figure 4:
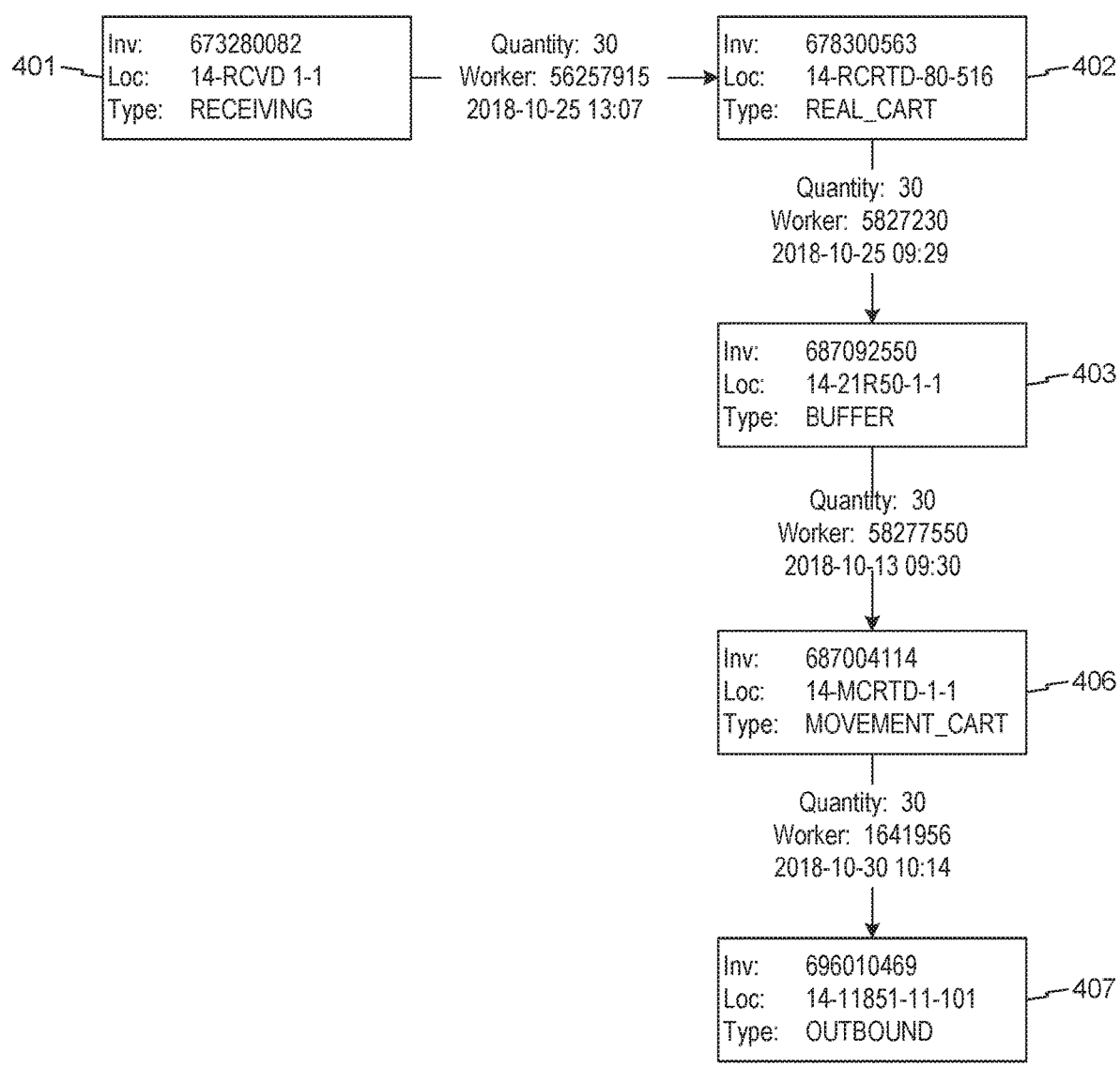
FIG. 4 is an exemplary diagram tracking the item through the supply chain, consistent with the disclosed embodiments.

FIG. 4 shows an exemplary diagram 400 tracking an item through a supply chain, consistent with the disclosed embodiments. In this exemplary diagram, the tracked item may be either a single item or a group of items that were kept together as a unit, such as a package of 30 stuffed animals. In this case, the diagram provides a straight flow of locations from inbound (or receiving) to outbound. Each block 401-407 represents a new location where the item is stored. In some embodiments, these blocks may include the inventory identifier, the location identifier, and/or the reason, or type, of move that was made. The type of move may be, for example, receiving, real cart storage, picking, buffer, movement cart, outbound, and any other label useful for tracking the item.

For example, the diagram 401 could be applied to the FC 200 of FIG. 2. In this example, block 401 represents a receiving station to a warehouse, such as inbound zone 203 in FIG. 2. The item is then moved (blocks 401->402) by a worker to a metal cart ("REAL_CART") to transport the item from the inbound zone 203 to buffer zone 205 (blocks 402->403). The item may then be transported from the buffer zone 205, on a cart ("MOVEMENT CART") (blocks 403->406) to an outbound location, such as camp zone 215 (blocks 406->407).

As shown in FIG. 4, the diagram may also include other identifiers, such as the user identifier, the number of subitems in the item, the date the item was moved, the time the item was moved, and any other useful information for tracking the item. In some embodiments, the information displayed in a diagram may be based on the information stored in association with each inventory identifier.

Figure 5:
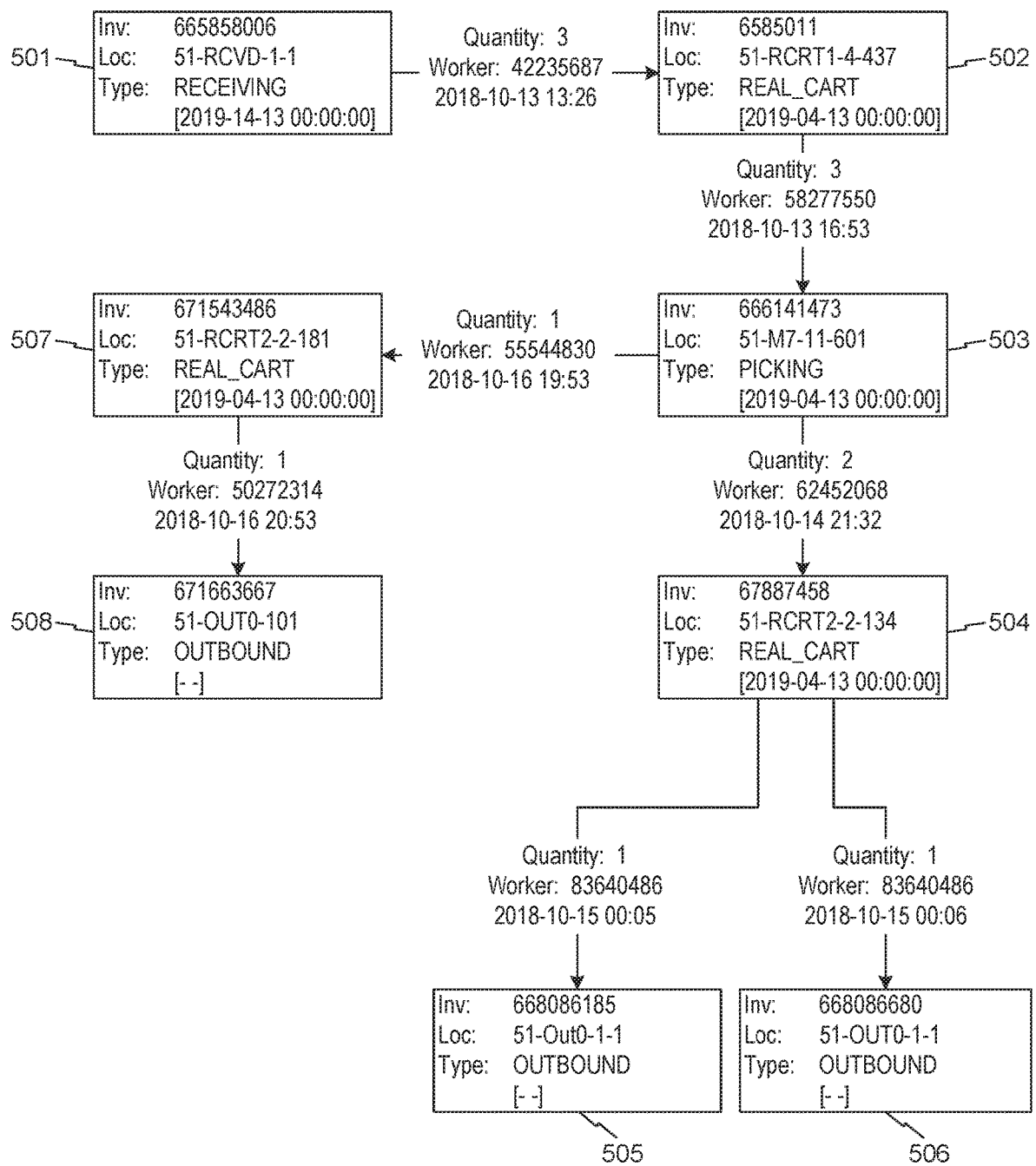
FIG. 5 is an exemplary diagram tracking the item through the supply chain, consistent with the disclosed embodiments.

FIG. 5 shows an exemplary diagram tracking the item through the supply chain, such as FC 200 from FIG. 2. In some embodiments, an item may be a group of subitems that were moved as a unit, such as a package of three stuffed animals. In this example, the item would be the complete package, and each stuffed animal would be a subitem. Sometimes, the subitems within the item must be divided, such as when there is limited shelf space at a location. Items may also be divided into subitems when one or more subitems are sold but the other subitems are not sold. In this scenario, it is still important to track every subitem of the original item. In some embodiments, when this happens a new inventory identifier is associated with the subitems. For example, the operator may enter a new inventory number or request the system to generate a new inventory number when the subitem is separated from the item. This new inventory identifier may be an entirely new number or may be based on the original inventory identifier. For example, the original inventory identifier may be 12345, and the inventory identifier for the new subitems may be 12345A and 12345B. Other embodiments or configurations of identifiers are possible.

FIG. 5 shows an example of how processor 602 may display this division of an item as a tree diagram. In this embodiment, dividing the item into subitems creates a node with different branches extending from the node, each branch representing a different subitem. For example, block 501 could represent an item being received in a warehouse as shown in FIG. 2. As indicated in FIG. 5, the item has three subitems indicated in the "Quantity" field (blocks 501->502). The item may then be placed onto a cart or other moving device ("REAL_CART") such as forklift 206, to transport the item from inbound zone 203 to picking zone 209 (blocks 502->503). From the picking zone 209, the item may be split into sub items (blocks 503->504, 507). As shown in block 504, two of the three subitems may be placed onto a cart ("REAL_CART"), and each one may be transported to two different outbound stations, such as two different camp zones 215 (blocks 505, 506). The third subitem may be sent to another outbound station (blocks 507->508).

Similar to FIG. 4, in some embodiments the blocks in FIG. 5 may include the inventory identifier, the location identifier, and/or the reason, or type, of move that was made. As shown in FIG. 5, the diagram may also include the user identifier, the number of subitems in the item, the date the item was moved, the time the item was moved, and any other useful information for tracking the item.

In some embodiments, processor 602 may also store the diagram in memory. The memory may be stored locally in memory device 604 of a portable computing device, in the WMS 119, or any other memory connected to WMS 119.

Computing devices described in the written description to perform the methods described herein as known in the art, and an exemplary computing device 600 are shown in FIG. 6. The computing device may be a mobile device such as a mobile phone, a PDA, or a tablet. Further, the computing device may be a computer terminal accessing WMS 119, a server, or any other type of computing device known in the art that accesses system 100. For example, computing device 600 may include one or more memory devices storing data and software instructions and one or more processors configured to use the data and execute the software instructions to perform operations including sending data and other operations known in the art. In some embodiments, computing device 600 may have an application installed thereon to perform one or more processes that are consistent with the disclosed embodiments. The components of computing device 600 may be implemented as specialized circuitry integrated within processor 602 or in communication with processor 602, and/or as specialized software stored in memory device 604 executable by processor 602.

Processor 602 may be implemented as one or more known or custom processing devices designed to perform functions of the disclosed methods, such as single- or multiple-core processors capable of executing parallel processes simultaneously to allow computing device 600 to execute multiple processes simultaneously. For example, processor 602 may be configured with virtual processing technologies. Processor 602 may implement virtual machine technologies, including a Java virtual machine, or other known technologies to provide the ability to execute, control, run, manipulate, store, etc., multiple software processes, applications, programs, etc. One of ordinary skill in the art would understand that other types of processor arrangements could be implemented that provide for the capabilities disclosed herein.

Memory device 604 may include instructions to enable processor 602 to execute programs, such as one or more operating systems, server applications, network communication processes, and any other type of application or software known to be available on computer systems. Alternatively or additionally, instructions may be stored in remote storage (not shown) in communication with computing device 600, such as one or more database or memory modules accessible over system 100.

In some embodiments, memory device 604 includes instructions that, when executed by processor 602, perform one or more processes consistent with the functionalities disclosed herein. Methods, systems, and articles of manufacture consistent with the disclosed embodiments are not limited to separate programs or computers configured to perform dedicated tasks. For example, memory device 604 may include one or more programs, as described herein, for execution by processor 602 to perform one or more functions of the disclosed embodiments. Moreover, processor 602 may execute one or more programs located remotely from computing device 600. For example, computing device 600 may access one or more remote programs, that, when executed, perform functions related to disclosed embodiments.

I/O device 606 may comprise one or more interfaces for receiving input signals from other devices and for providing output signals to other devices to allow data to be received and/or transmitted by computing device 600. I/O device 606 may receive input signals from a screen (e.g., a touch screen or a stylus-activated screen), a network controller or device (e.g., wireless, wired, cellular, or satellite), or non-tactile inputs (e.g., keyboard or mouse). I/O device 606 may also include interface components that display information and/or provide interfaces to one or more input devices, such as one or more keyboards, mouse devices, and the like, to enable computing device 600 to receive input from a recipient (not shown). Processor 602 may utilize data from a network device in I/O device 606 (e.g., signal strength, IP address, or the like) to determine a location of computing device 600. For example, processor 602 may use triangulation, IP address geolocation, signal strength analysis or signal strength mapping, or the like.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

The programs may include, for example, an operating system. Programs may be implemented or integrated using one or more commercial and/or open sourced platforms, such as Chassis™, PostgreSQL™, Apache Kafka™, Open NLP™, Spark™, Amazon Web Services™, Docker™, Jenkins™, HTML™, CSS™, Less™, AngularJS™, etc.

Memory 604 may further include the programs in accordance with the disclosed embodiments. The programs may further include components that facilitate learning and data analysis by processor 602 such as one or more data processing module(s), machine learning module(s), artificial intelligence module(s), neural network module(s), analytic module(s), and/or other modules. Various components of these programs may be used in the disclosed embodiments. The programs may be constructed in a highly adaptive way, such as using, for example, representation state transfer technology.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for tracking items in a supply chain, the system comprising:
   a memory storing instructions; and
   at least one processor configured to execute the instructions to:
   receive, from a first user device, a first input that an item has entered a first station, wherein:
   the first input comprises a first location identifier and a user identifier of a user of the first user device, and
   the first input is received in response to the first user device scanning a barcode on the item;
   assign an inventory identifier to the item;
   store the first location identifier and the inventory identifier in a data store, associating the inventory identifier with the first location identifier and the user identifier;
   receive a second input comprising the inventory identifier and a second location identifier when the item is moved to a second station;
   store the second location identifier such that the second location identifier is associated with the inventory identifier;
   receive a request for a diagram from a second user device;
   generate, in response to the request, a diagram tracking scans of the item performed at multiple locations and user identifiers associated with scanning the item at the multiple locations, wherein the diagram includes location identifiers and item identifiers based on the performed scans to track the item from the first station to a most recent station; and
   transmit the diagram for display at the second user device.

2. The computer-implemented system of claim 1, wherein the second input is received in response to a third user device scanning the barcode on the item at the second location.

3. The computer implemented system of claim 1, wherein the diagram is generated based on a linked list identifying scan data associated with the inventory identifier.

4. The computer-implemented system of claim 1, wherein the user identifier identifies what user placed the item in the first station.

5. The computer-implemented system of claim 1, wherein the second input also includes a user identifier that identifies what user placed the item in the second station.

6. The computer-implemented system of claim 1, wherein the item contains subitems that receive a subitem inventory identifier when the subitems are stored in different location identifiers.

7. The computer-implemented system of claim 1, wherein the inventory identifier accounts for subitems by creating a subitem inventory identifier that appends additional information to the end of the inventory identifier.

8. The computer-implemented system of claim 1, wherein the diagram is a tree diagram.

9. The computer-implemented system of claim 1,
   wherein the inventory identifier accounts for subitems by creating a subitem inventory identifier that appends additional information to the end of the inventory identifier; and
   wherein the diagram is a tree diagram with each branch of the tree diagram representing a different subitem.

10. The computer-implemented system of claim 1, wherein the first input comprises at least one of the inventory identifier, a package identifier, an employee identifier, a device identifier, an International Mobile Subscription Identifier, a phone number, a Universal Unique Identifier, a Globally Unique Identifier, a date, or a time.

11. A method for tracking items in a supply chain, comprising the steps of:
   receiving, from a first user device, a first input that an item has entered a first station, wherein:
   the first input comprises a first location identifier and a user identifier of a user of the first user device, and
   the first input is received in response to the first user device scanning a barcode on the item;

assigning an inventory identifier to the item;
storing the first location identifier and the inventory identifier, comprising associating the inventory identifier with the first location identifier and the user identifier;
receiving a second input comprising the inventory identifier and a second location identifier when the item is moved to a second station;
storing the second location identifier such that the second location identifier is associated with the inventory identifier;
receiving a request for a diagram from a second user device;
generating, in response to the request, a diagram tracking scans of the item performed at multiple locations and user identifiers associated with scanning the item at the multiple locations, wherein the diagram includes location identifiers and item identifiers based on the performed scans to track the item from the first station to a most recent station; and
transmitting the diagram for display at the second user device.

12. The method of claim 11 further comprising storing the diagram.

13. The method of claim 11, wherein the location identifiers and inventory identifier are stored in at least one database.

14. The method of claim 11, wherein the user identifier identifies what user placed the item in the first station.

15. The method of claim 11, wherein the second input also includes a user identifier that identifies what user placed the item in the second station.

16. The method of claim 11, wherein the item contains subitems that receive a subitem inventory identifier when the subitems are stored in different location identifiers.

17. The method of claim 11, wherein the inventory identifier accounts for subitems by creating a subitem inventory identifier that appends additional information to the end of the inventory identifier.

18. The method of claim 11,
wherein the inventory identifier accounts for subitems by creating a subitem inventory identifier that appends additional information to the end of the inventory identifier; and
wherein the diagram is a tree diagram with each branch of the tree diagram representing a different subitem.

19. The method of claim 11, wherein the first input comprises at least one of the inventory identifier, a package identifier, an employee identifier, a device identifier, an International Mobile Subscription Identifier, a phone number, a Universal Unique Identifier, a Globally Unique Identifier, a date, or a time.

20. A computer-implemented system for tracking items in a supply chain, the system comprising:
a memory storing instructions; and
at least one processor configured to execute the instructions to:
receive, from a first user device, a first input that an item has entered a first station, the first input comprising a first location identifier and a user identifier, and wherein the first input includes scan data from the first user device scanning the item, the scan data comprises at least one of the inventory identifier, a package identifier, the user identifier, an employee identifier, a device identifier, an International Mobile Subscription Identifier, a phone number, a Universal Unique Identifier, a Globally Unique Identifier, a date, a time, and the location identifier;
assign an inventory identifier to the item, wherein the inventory identifier accounts for subitems by creating a subitem inventory identifier that appends additional information to the end of the inventory identifier;
store the location identifier and the inventory identifier, the storing comprising associating the inventory identifier with the location identifier and the user identifier;
receive a second input comprising the inventory identifier and a second location identifier when the item is moved to a second station, wherein the second input includes scan data from a user scanning the item, the scan data comprises at least one of the inventory identifier, a package identifier, a user identifier, an employee identifier, a device identifier, an International Mobile Subscription Identifier, a phone number, a Universal Unique Identifier, a Globally Unique Identifier, a date, a time, and the second location identifier;
store the second location identifier such that the second location identifier is associated with the inventory identifier;
receive a request for a diagram from a second user device;
generate, in response to the request, a diagram tracking scans of the item performed at multiple locations and user identifiers associated with scanning the item at the multiple locations, wherein the diagram tracks the item from the first station to a most recent station, and wherein the diagram is a tree diagram comprising branches representing a different subitem when the item is divided into subitems and branch division points including location identifiers associated with item identifiers based on the performed scans; and
transmit the diagram for display at the second user device.

* * * * *